（12）United States Patent
Horii

(10) Patent No.: US 8,527,501 B2
(45) Date of Patent: *Sep. 3, 2013

(54) METHOD, SYSTEM, AND PROGRAM FOR COMBINING AND PROCESSING TRANSACTIONS

(75) Inventor: Hiroshi Horii, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 41 days.

This patent is subject to a terminal disclaimer.

(21) Appl. No.: 13/172,142

(22) Filed: Jun. 29, 2011

(65) Prior Publication Data

US 2012/0005196 A1    Jan. 5, 2012

(30) Foreign Application Priority Data

Jul. 1, 2010    (JP) ................. 2010-150989

(51) Int. Cl.
  *G06F 7/00*   (2006.01)
  *G06F 17/30*  (2006.01)
(52) U.S. Cl.
  USPC ..................................... 707/713; 707/722
(58) Field of Classification Search
  USPC .............................. 707/722, 713
  See application file for complete search history.

(56) References Cited

U.S. PATENT DOCUMENTS

| 2003/0055826 A1* | 3/2003 | Graham ..................... 707/10 |
| 2003/0074342 A1* | 4/2003 | Curtis .......................... 707/1 |
| 2003/0083429 A1* | 5/2003 | Smith et al. ............... 524/779 |
| 2004/0158549 A1* | 8/2004 | Matena et al. .............. 707/1 |

FOREIGN PATENT DOCUMENTS

| JP | 05-108452 | 10/1991 |
| JP | 03-318182 | 12/1991 |
| JP | 05-225239 | 10/1992 |
| JP | 11-161530 | 6/1999 |
| JP | 11-234269 | 8/1999 |
| JP | 2007-156916 | 6/2007 |
| JP | 2007-183728 | 7/2007 |
| JP | 2009-271665 | 11/2009 |

OTHER PUBLICATIONS

"SQL: Union All Query." Tech on the Net. Apr. 20, 2010.*

* cited by examiner

*Primary Examiner* — Kimberly Wilson
(74) *Attorney, Agent, or Firm* — Cantor Colburn LLP; Dwayne Nelson

(57) ABSTRACT

A method, system, and program for combining and processing transactions. The method includes the steps of: receiving a plurality of transactions from a plurality of clients, where each of the plurality of transactions includes a select query; combining the select queries in the transactions; and sending combined select queries to the database as a combined transaction.

13 Claims, 19 Drawing Sheets

FIG. 15

```
SQL A
    UPDATE TABLE1 SET C1 = 'TEST' WHERE ID =100
SQL B
    SELECT * FROM TABLE1 WHERE ID =101
SQL C
    SELECT * FROM TABLE1 WHERE ID = (SELECT AVG(ID) FROM TABLE1)
```

FIG. 16

```
SQL D
    SELECT * FROM TABLE1 WHERE ID =101
SQL E
    UPDATE TABLE1 SET C1 = 'TEST' WHERE ID =100
SQL F
    UPDATE TABLE1 SET C1 = 'TEST' WHERE ID =101
```

FIG. 19

| INT | INT | Double | STRING | DATE |
|---|---|---|---|---|
| 1 | 1 | 0.001 | "AAAA" | |
| 1 | 2 | 0.002 | "BBBB" | |
| 2 | 3 | 0.003 | | 6/3/2010 |
| 2 | 4 | 0.004 | | 6/4/2010 |
| 2 | 5 | 0.005 | | 6/5/2010 |

| INT | Double | STRING |
|---|---|---|
| 1 | 0.001 | "AAAA" |

| INT | Double | STRING |
|-----|--------|--------|
| 1   | 0.001  | "AAAA" |
| 2   | 0.002  | "BBBB" |

| Double | INT | DATE |
|--------|-----|------|
| 0.003  | 3   | 6/13/2010 |
| 0.004  | 4   | 6/13/2010 |
| 0.005  | 5   | 6/13/2010 |

METHOD, SYSTEM, AND PROGRAM FOR COMBINING AND PROCESSING TRANSACTIONS

CROSS-REFERENCE TO RELATED APPLICATION

This application claims priority under 35 U.S.C. §119 from Japanese Patent Application No. 2010-150989 filed Jul. 1, 2010, the entire contents of which are incorporated herein by reference.

BACKGROUND OF THE INVENTION

1. Field of the Invention

The present invention relates to a method for processing transactions. More particularly, the present invention is related to a method and system for processing a combined transaction including multiple select queries.

2. Description of Related Art

Generally, transaction processing in a database is designed so that the database is kept consistent. In transaction processing, all of multiple interdependent operations are always either completed or cancelled. For that purpose, the lock, rollback, and deadlock avoidance mechanisms exist.

A lock refers to controlling access to or update of specific data. In particular, a lock refers to, in writing to a database, temporarily restricting access to the database, that is, temporarily restricting data read or write from or to the database to maintain data integrity. More specifically, exclusive control is performed which, when one process is accessing data X, prevents another process from accessing X. Where one process is represented by two or more SQL statements, a transaction is used.

A transaction is a function that can collectively commit (determine) or roll back (cancel) a series of processes (processing of multiple select and update queries by using SQL statements). By using a transaction, when one SQL statement fails, all the other SQL statements in the same process can be cancelled. A rollback refers to a process of, when a transaction fails before committed, restoring the database to its state before starting the transaction. A deadlock refers to a phenomenon in which two or more transactions being processed are prevented from proceeding when attempting to concurrently access the same portion of the database. For example, assuming that a transaction A is accessing data X and a transaction B is accessing data Y, a deadlock occurs when A attempts to access Y or when B attempts to access X. In this case, any transactions cannot proceed. To avoid such a deadlock, both transactions are cancelled and rolled back. The transactions are performed again in a changed order to prevent recurrence of a deadlock.

Japanese Unexamined Patent Application Publication No. 1993-0108452 discloses a technology, which in controlling concurrent execution of multiple transactions using multiple lock controls, accumulates lock requests made continuously, and when a request other than a lock request is made, sends the accumulated lock requests collectively to the database server and processes the locks before processing this request so as to reduce the frequency of sending a lock request.

Japanese Unexamined Patent Application Publication No. 2009-0271665 discloses a method of, rather than processing inputted multiple transactions separately, retrieving a data item to be processed by the multiple transactions only once, updating the multiple transactions sequentially with respect to the retrieved data item in the main memory, and writing only the update results to the database.

The above-mentioned conventional methods do not employ a method of combining multiple transactions into one and requesting the database to process the combined transaction. The reasons are because it is difficult to combine SQL statements present in multiple transactions (select queries), and even if SQL statements can be combined, a deadlock can occur if there is a single transaction for updating the referred data when a combined select query is being sent to the database.

SUMMARY OF THE INVENTION

Accordingly, one aspect of the invention provides a method for accessing a database and combining a plurality of transactions by a computer, the method including the steps of: receiving a plurality of transactions from a plurality of clients, where the plurality of transactions each includes a select query; combining the select queries in the transactions; and sending combined select queries to the database as a combined transaction.

Another aspect of the present invention provides a system for accessing a database and combining a plurality of transactions, the system including: a receiving module for receiving a plurality of transactions from a plurality of clients, where the plurality of transactions each includes a select query; a combining module for combining the select queries in the transactions; and a transaction sending module for sending combined select queries to the database as a combined transaction.

BRIEF DESCRIPTION OF THE DRAWINGS

FIG. 15 shows an example SQL statement.

FIG. 16 shows another example SQL statement.

FIG. 19 shows an example of the result received from the database 130.

FIG. 20 shows a first example of division of the result received from the database 130 into results for respective clients.

FIG. 21 shows a second example of division of the result received from the database 130 into results for respective clients.

FIG. 22 shows a third example of division of the result received from the database 130 into results for respective clients.

DETAILED DESCRIPTION OF THE PREFERRED EMBODIMENTS

Figure 1:
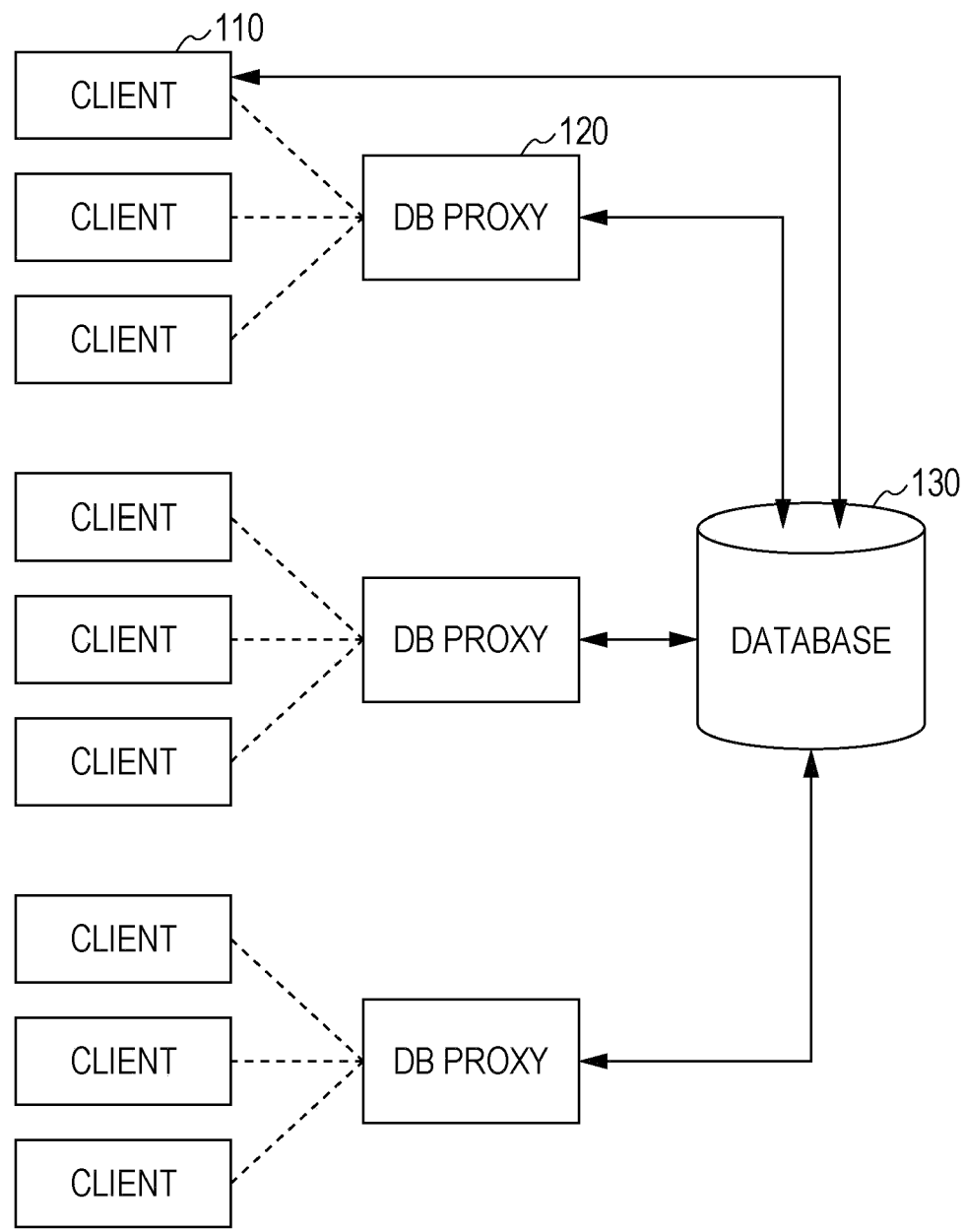
FIG. 1 shows an overall system configuration according to an embodiment of the present invention.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer. Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows an overall system configuration according to the present invention. DB proxies 120 combine transactions from multiple clients 110 and send a combined transaction to a database 130. A single DB proxy 120 is provided for multiple clients.

The database 130 processes multiple SQL statements received from any client 110 or DB proxy 120 as a single transaction.

Each DB proxy 120 reports the start of a transaction to the database 130, sends an SQL statement thereto, receives the result of the SQL statement therefrom, and sends a commit request thereto. Generally, sending of an SQL statement and reception of the result are performed multiple times.

In an embodiment of the present invention, a process that each client 110 performs in starting a transaction and respective processes that each client 110 performs in sending a select SQL statement, an update SQL statement, and a commit or rollback request will be described in detail. Processes that each DB proxy 120 performs when receiving select SQL statements from the clients 110 and when receiving commit requests from the clients 110 after the above-mentioned processes performed by the clients 110 will be described in detail.

To simplify the description, it is assumed that each DB proxy 120 and client 110 request the database to execute only one transaction at a time. It is also assumed that the clients 110 and the DB proxies 120 have a relationship of N:1.

Figure 2:
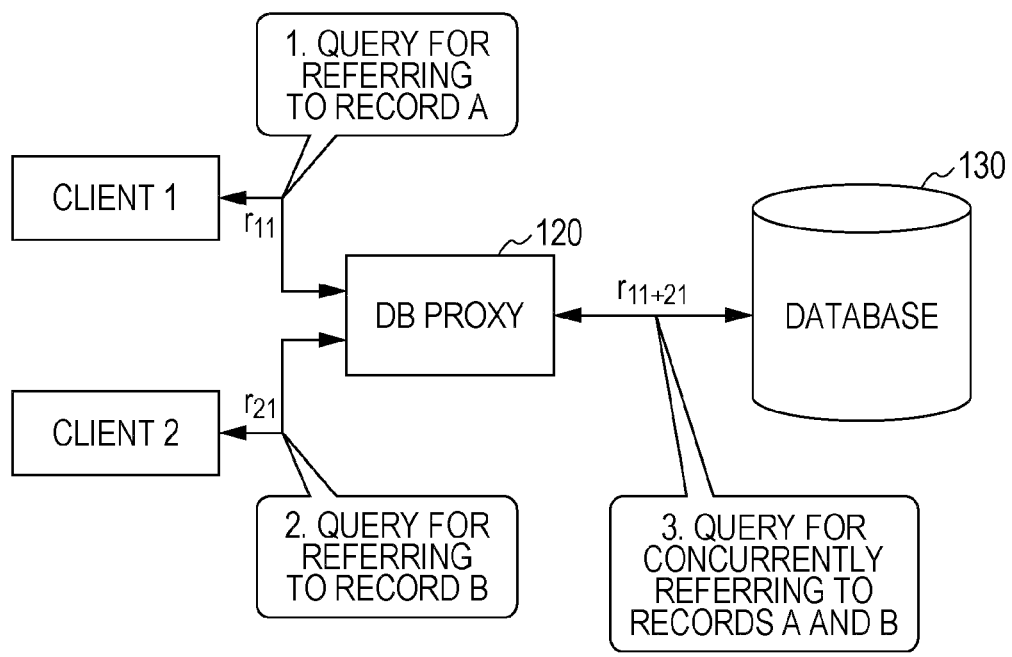
FIG. 2 is a diagram showing a case where transactions are combined and then sent to a database 130.

FIG. 2 shows a case where transactions are combined and then sent to the database 130. In FIG. 2, the DB proxy 120 combines select queries in the transactions of clients 1 and 2 and requests the database to execute the combined select queries, thereby increasing the throughput of the database. In the drawings, r represents "read", w represents "write", the first subscript represents a client number, and the second subscript represents a chronological order.

In FIG. 2, the clients 1 and 2 send select queries in transactions to the corresponding DB proxy 120. The DB proxy 120 combines the select queries received from the multiple clients into a single query and requests the database 130 to process the single query as a reference transaction. Generally, a select query sent by each client is an SQL statement. Accordingly, the DB proxy 120 combines two SQL statements, that is, an SQL statement for referring to a record A sent by the client 1 and an SQL statement for referring to a record B sent by the client 2, both SQL statements having the same chronological order, into a signal SQL statement and then sends the signal SQL statement to the database 130.

Embodiment

Figure 17:
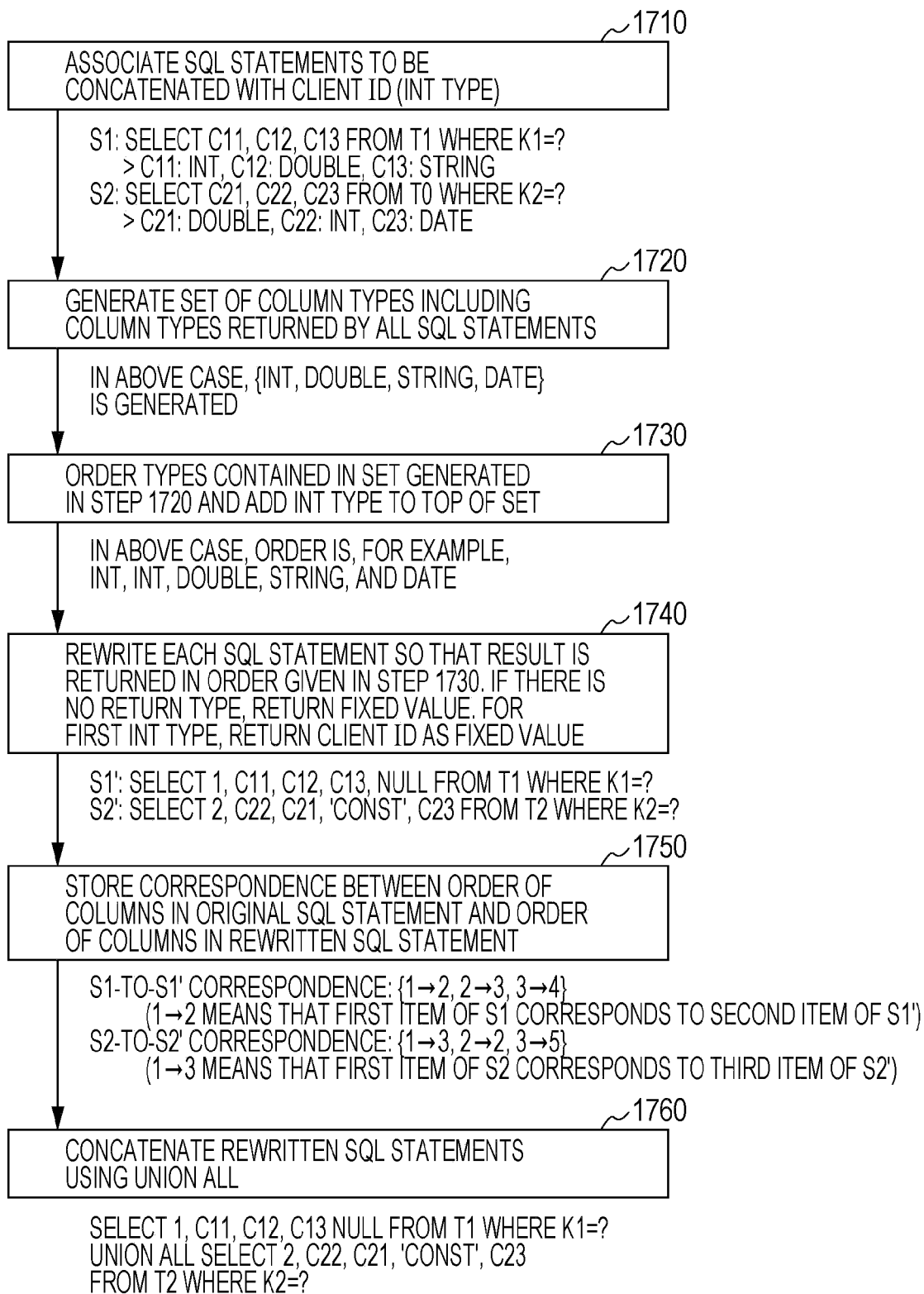
FIG. 17 is a flowchart showing combination of SQL statements, SELECT statements.

FIG. 17 is a flowchart showing the combination of SQL statements, SELECT statements. In the present invention, a set operator, UNIONALL, is used to combine SELECT statements. A set operator, UNION, is an operator for combining multiple SELECT statements into one. On the other hand, multiple queries cannot be combined into one unless the lists of extraction items of the queries have the same number and unless the queries are composed of data types of the same group. Use of this method allows combination of any SQL statements.

First, in step 1710, SELECT statements to be concatenated are associated with a client ID (int type). For example, the following two SELECT statements are assumed to be concatenated.

S1: SELECT C11, C12, C13 FROM T1 WHERE K1=?→the client ID is assumed to be 1. >C11: INT, C12: DOUBLE, C13: STRING S2: SELECT C21, C22, C23 FROM TO WHERE K2=?→the client ID is assumed to be 2. >C21: DOUBLE, C22: INT, C23: DATE In step 1720, a set of data types, including the data types (columns) returned by all SELECT statements, is generated. At this time, data types of the same group are combined into one without increasing the number of types, and data types of a different group are newly added.

That is, only different types are added in the generation of a set of types.

In this example, {INT, DOUBLE, STRING, DATE} is generated.

In step 1730, the types contained in the set generated in step 1720 are ordered, and int type is added to the top of the set. In this example, the order is INT, INT, DOUBLE, STRING, and DATE.

In step 1740, each SELECT statement is rewritten so that the result is returned in the order given in step 1730. If there is no return type, a fixed value is returned. For the first int type, the client ID is returned as a fixed value.

S1': SELECT 1, C11, C12, C13, NULL FROM T1 WHERE K1=?

S2': SELECT 2, C22, C21, 'CONST', C23 FROM T2 WHERE K2=?

In step 1750, the correspondence between the order of the data types (columns) of the original SELECT statement and the order of the data types (columns) of the rewritten SELECT statement is stored. The information stored is used to divide the result later.

S1-to-S1' correspondence: {1→2, 2→3, 3→4} (1→2 means that the first item of S1 corresponds to the second item of S1')

S2-to-S2' correspondence: {1→3, 2→2, 3→5} (1→3 means that the first item of S2 corresponds to the third item of S2')

In step 1760, the rewritten SELECT statements are concatenated using UNION ALL and then sent to the database 130.

SELECT 1, C11, C12, C13, NULL FROM T1 WHERE K1=? UNION ALL SELECT 2, C22, C21, 'CONST', C23 FROM T2 WHERE K2=?

Figure 18:
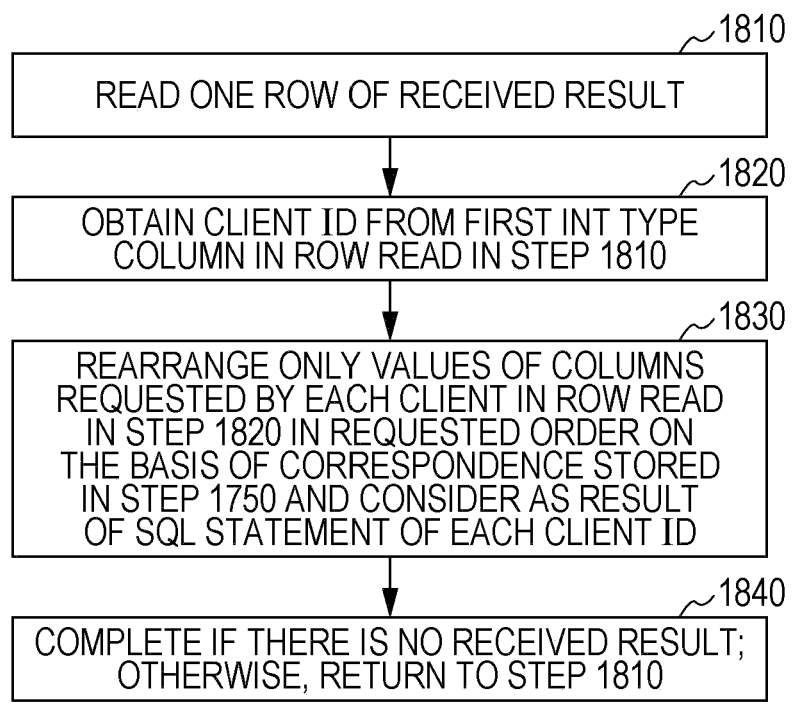
FIG. 18 is a flowchart showing division of the result received from the database 130 into results for respective clients.

FIG. 18 is a flowchart showing the division of the result received from the database 130 into results for respective clients.

FIG. 19 shows an example of the result received from the database 130. In the table, data where INT, INT, DOUBLE, STRING, and DATE are arranged in that order from the left is present in five rows. The int type data at the left end represents a client ID.

In step 1810, one row of the result received from the database 130 is read. That is, 1, 1, 0.001, and "AAAA" in the first row are read. In step 1820, a client ID is obtained from the first int type data in the row read in step 1810. In this case, the client ID is 1, so it is understood that the client is the client 1.

In step 1830, only the data type values requested by the applicable client in the row read in step 1820 are rearranged in the requested order on the basis of the correspondence between the data type orders stored in step 1750. These data type values are considered as the result of the SELECT statement of the client ID.

Since the S1-to-S1' correspondence of the client 1 is {1→2, 2→3, 3→4}, the data in the first row is converted as shown in FIG. 20. Repeating this process allows data for the client 1 to be separated from the original result and converted, as shown in FIG. 21.

The data in the third and later rows is the result for the client 2. Accordingly, referring to the S2-to-S2' correspondence {1→3, 2→2, 3→5}, data is separated from the original result and converted, as shown in FIG. 22.

If there is no received result in step 1840, the process is completed. Otherwise, the process returns to step 1810.

The characteristics of the combination and separation according to the present invention are summarized as follows.

Use only data type information which is the subject of SELECT to determine the data type of UNION ALL.

Divide the received result into results for respective clients on the basis of the correspondence between the data (column) names of UNION ALL and the data (column) names of the SELECT statements sent by the clients.

Generate an empty result (ResultSet) if the ID of the SELECT statement is not contained in the result.

In this way, the DB proxy 120 according to the present invention can combine multiple select SQL statements, request the database to process the combined select SQL statement, divide the reference result into results for respective clients, and return each result to the corresponding client.

Figure 3:
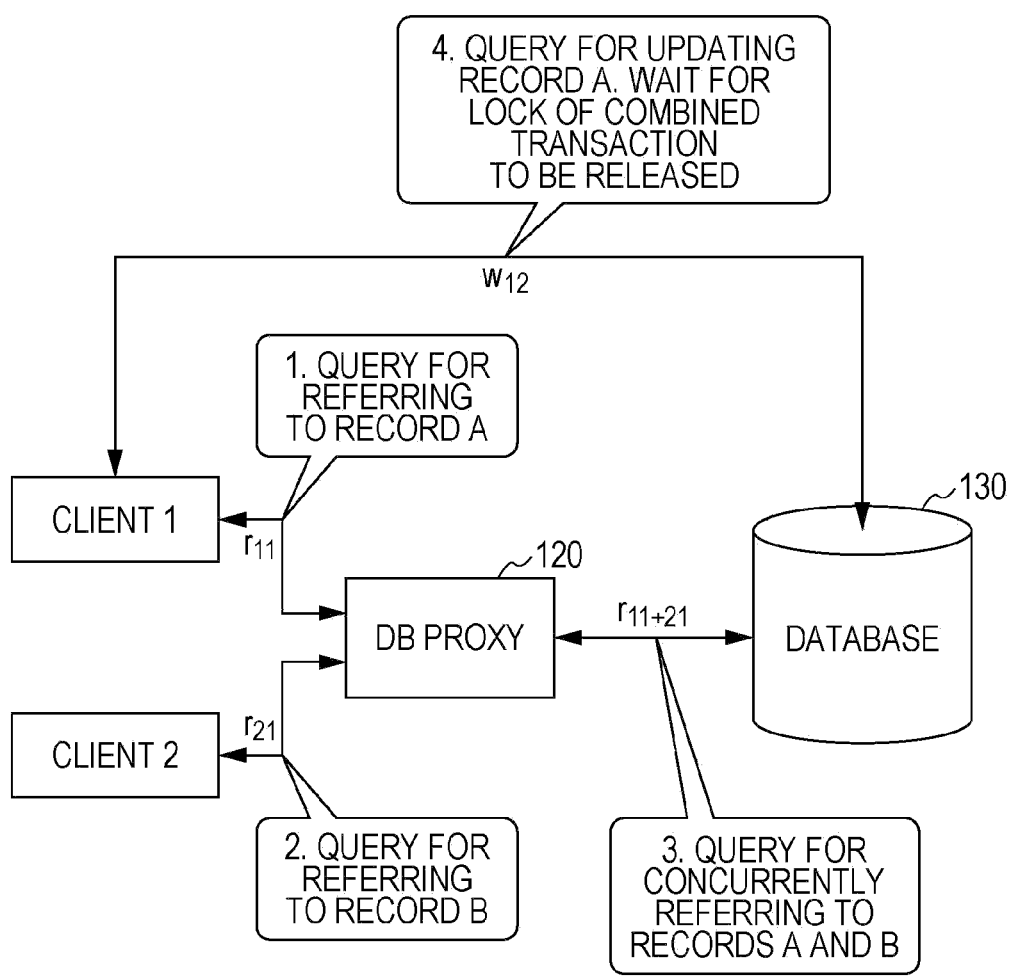
FIG. 3 is a diagram showing a problem with a combined transaction.

Problems that occur after sending the combined query in FIG. 2 will be described with reference to FIG. 3.

1. The client 1 sends a select query (r11 for referring to a record A) in a transaction to the DB proxy 120.
2. The client 2 sends a select query (r21 for referring to a record B) in a transaction to the DB proxy 120.
3. The DB proxy 120 combines the select queries received from the clients 1 and 2 into a single query and requests the database 130 to process the combined query as a combined transaction (r11+r21 for concurrently referring to the records A and B).
4. Subsequently, the client 1 sends an update query in the same transaction to the database 130 as an update transaction (w12 for updating the record A), apart from the combined reference transaction (select query) that the client 1 has sent through the DB proxy 120.

However, since the record A is locked by the combined transaction, the update transaction is not processed before the lock of the record A is released. Unfortunately, the lock is not released.

This is because the update transaction sent by the client 1 cannot be committed unless the reference transaction sent through the DB proxy 120 is committed. Conversely, the reference transaction sent through the DB proxy 120 is not committed unless it is reported that the update transaction sent by the client 1 has been committed. That is, when an attempt is made to update the record A referred to by the select query sent through the DB proxy 120 in the same transaction, a deadlock necessarily occurs.

Figure 4:
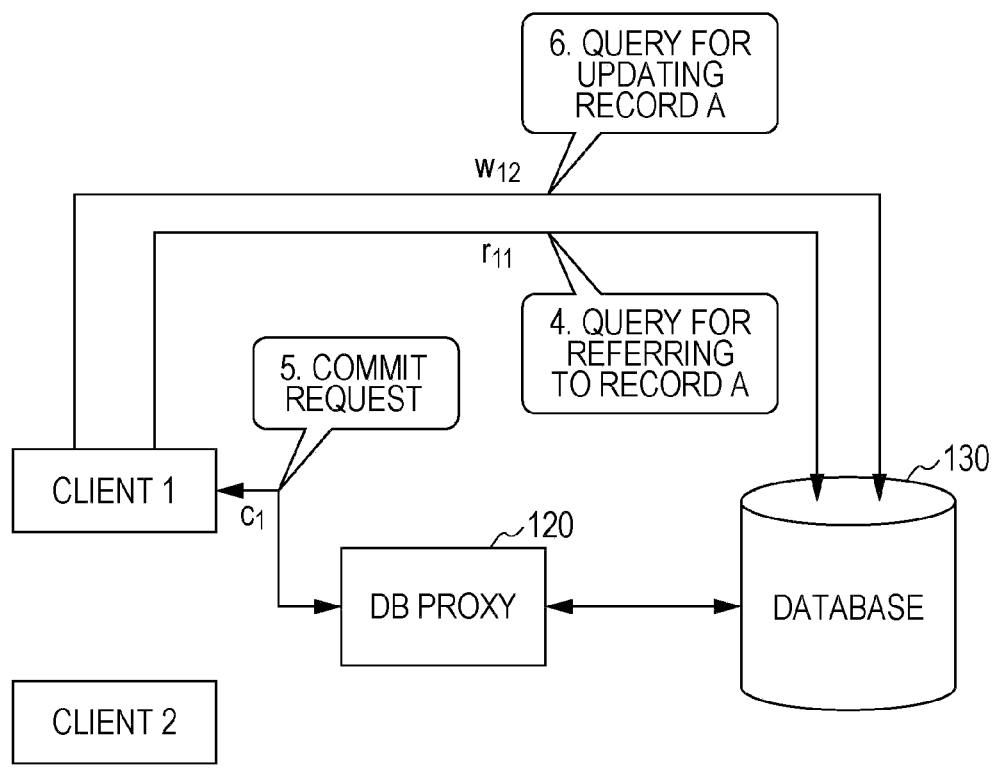
FIG. 4 shows an example of processing of a combined transaction according to an embodiment of the present invention.

For this reason, the present invention employs the method of FIG. 4. According to the following procedure, no deadlock occurs even when an attempt is made to update the record referred to in the combined transaction. That is, in an attempt to update the data referred to in the combined transaction, the client 1.

4. first inquires of the DB proxy 120 whether the record A to be updated has been referred to in the combined transaction, and if the record A has been referred to in the combined transaction, directly requests the database 130 to process as a transaction the select query processed in the combined transaction.
5. sends a commit request to the DB proxy 120.
6. directly requests the database 130 to process as a transaction a query for updating the record A.

Figure 5:
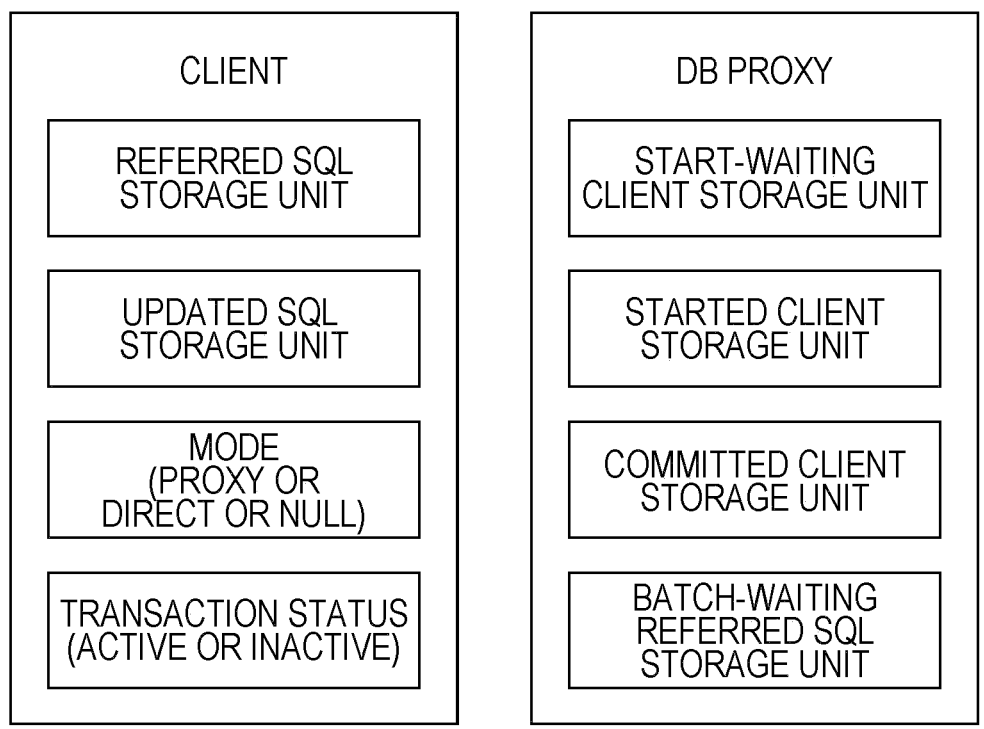
FIG. 5 is a block diagram showing the storage configuration of a client and a DB proxy 120.

FIG. 5 is a block diagram showing the storage configuration of a client and a DB proxy 120. For the sake of explanation, assume that the DB proxy 120 executes only one transaction.

The client controls a referred SQL storage unit, an updated SQL statement storage unit, the mode, and the transaction status. The referred SQL storage unit holds the history of SQL statements processed in a transaction currently being executed. The updated SQL statement storage unit holds the history of update SQL statements processed in a transaction currently being executed.

The mode refers to the sending mode of a select SQL statement. In proxy mode, a select SQL statement is sent preferentially through a DB proxy; in direct mode, it is sent directly. Null means that the mode is not determined. The transaction status refers to the status of a transaction that the client directly requests. In active, the client is requesting the execution of a transaction; in inactive, it is not requesting the execution of any transaction.

The DB proxy controls a start-waiting client storage unit, a started client storage unit, a committed client storage unit, and a batch-waiting reference SQL storage unit.

The start-waiting client storage unit holds a list of the identifiers of clients which have sent SQL statements to be batched by the DB proxy in the next transaction. The started client storage unit holds a list of the identifiers of clients which have sent SQL statements which the DB proxy are currently batching.

The committed client storage unit holds a list of the identifiers of clients from which the DB proxy has received commit requests among the clients stored in the started client storage unit. The batch-waiting reference SQL storage unit holds SQL statements that have been sent to the DB proxy by the clients stored in the started client storage unit and that have not been sent to the database by the DB proxy.

Figure 6:
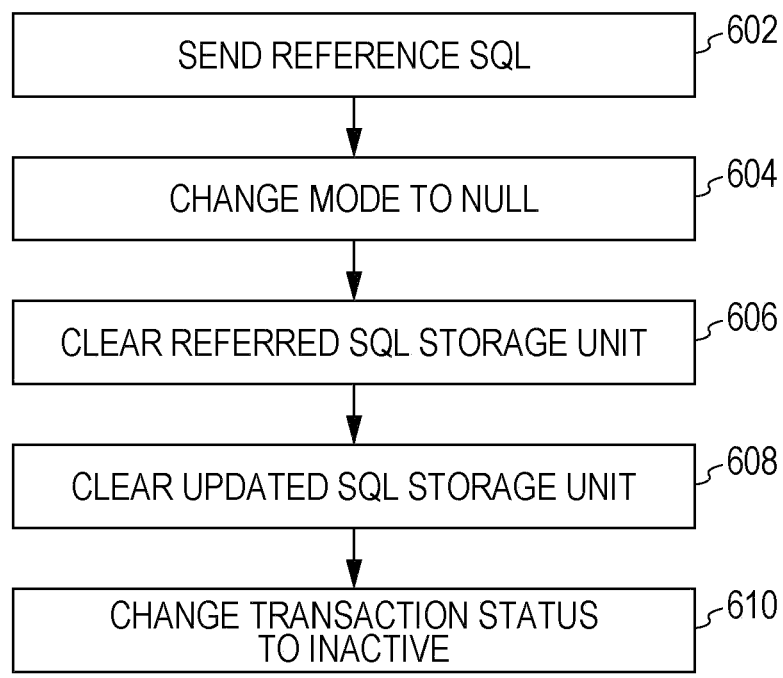
FIG. 6 shows a process that a client performs in starting a transaction.

FIG. 6 shows a process that a client performs in starting a transaction.

In step 602, the client sends a select SQL statement. In step 604, the client changes the mode to null. In step 606, the client clears the referred SQL storage unit. In step 608, the client clears the updated SQL statement storage unit. Lastly in step 610, the client changes the transaction status to inactive.

Figure 7:
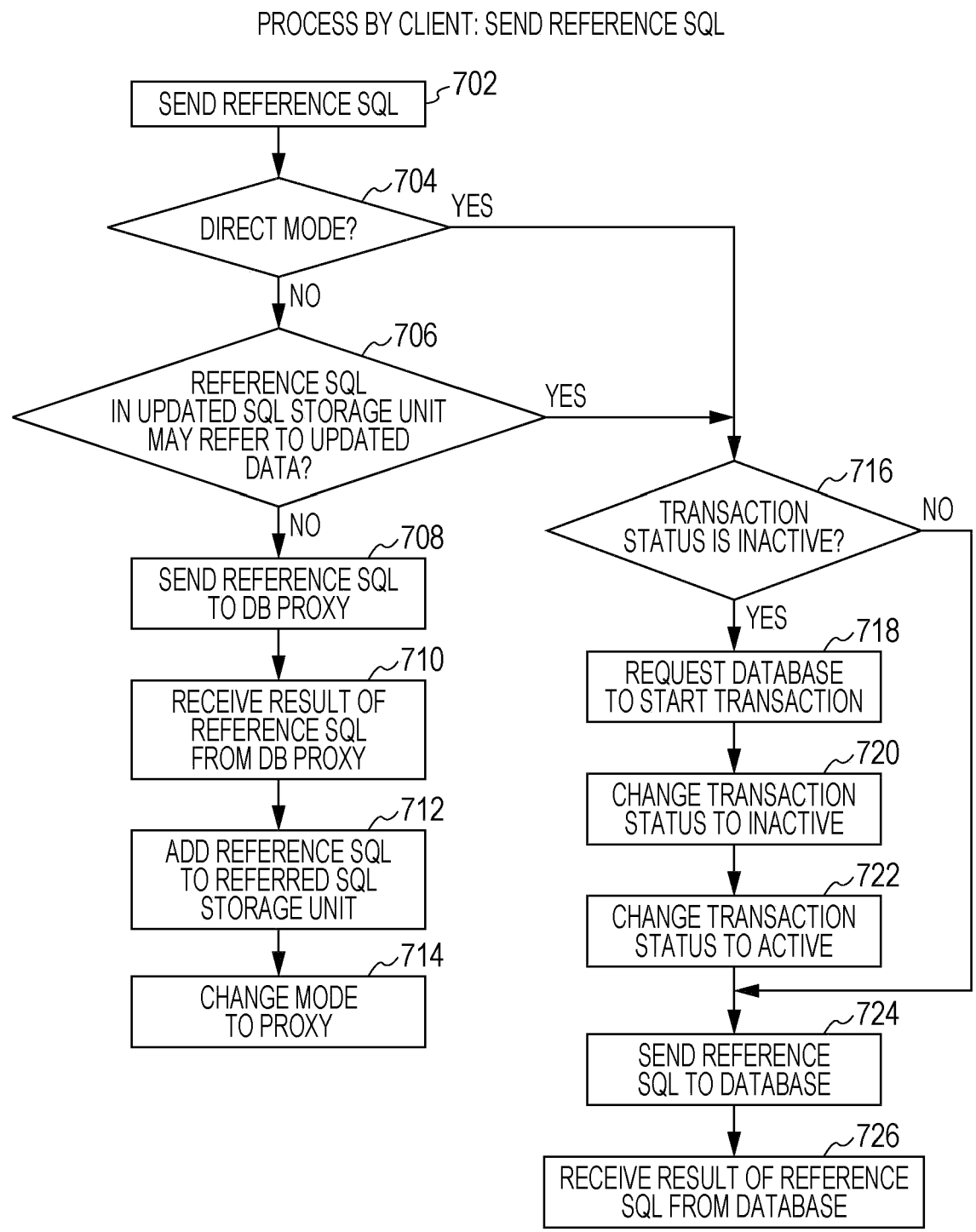
FIG. 7 is a flowchart of a process that a client performs in sending a select SQL statement.

FIG. 7 is a flowchart of a process that a client performs in sending a select SQL statement.

In sending a select SQL statement, the client determines in step 704 whether the mode is direct. If the mode is null or proxy, the client proceeds to step 706 to determine whether it can send a select SQL statement through the proxy.

To check whether it can send a select SQL statement through the proxy, the client determines in step 706 whether the select SQL statement is likely to refer to data already updated by the client in the same transaction.

For example, if SQL A (UPDATE) of FIG. 15 has been already executed and if the client sends a select SQL statement, SQL B (SELECT), the select SQL statement will not refer to the updated data. Thus, the client can send the select SQL statement through the proxy.

On the other hand, if the client sends a select SQL statement, the reference SQL is likely to refer to the updated data. Thus, the client cannot send the reference SQL through the proxy. This SQL is as follows:
SELECT * FROM TABLE1 WHERE ID=100

For queries in which referred data cannot be recognized, such as SQL C (SELECT), the client also determines that it cannot send such a query through the proxy.

In step 708, if the client desires to send through a proxy, it sends the select SQL statement through the DB proxy. In step 710, it receives the result of the select SQL statement from the DB proxy. In step 712, the client adds the select SQL statement to the referred SQL storage unit and, in step 714, changes the mode to proxy.

In contrast, if the client does not desire to send the select SQL statement through a proxy, it directly sends the select SQL statement to the database and then receives the result of the select SQL statement therefrom. If no transaction has been started (if the transaction status is inactive) in step 716, the client requests the database 130 to start a transaction in step 718. In step 722, the client changes the transaction status to active and, in step 724, sends a select SQL statement to the database 130. In step 726, the client receives the result of the select SQL statement from the database 130.

Figure 8:
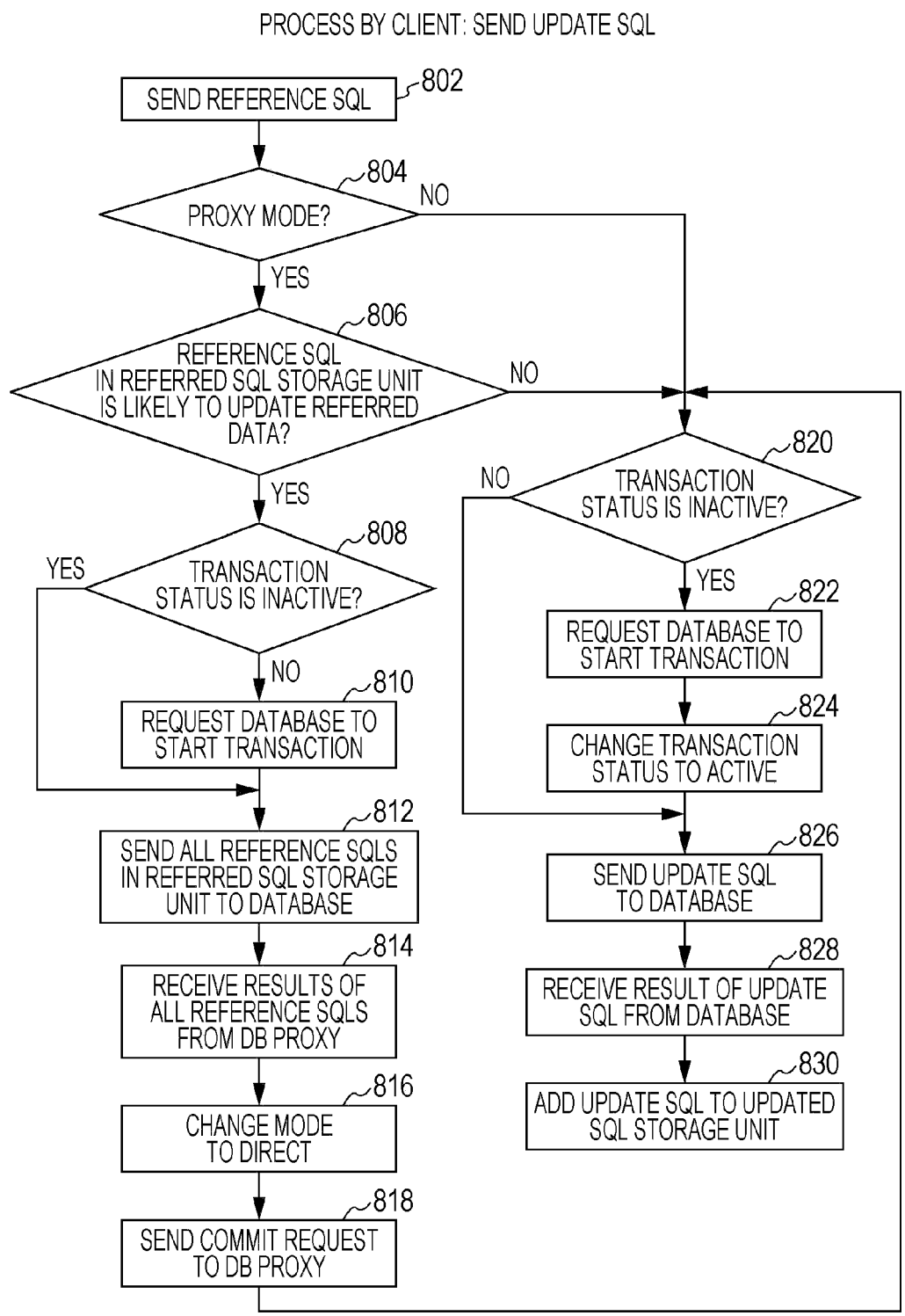
FIG. 8 is a flowchart of a process that a client performs in sending an update SQL statement.

FIG. 8 is a flowchart of a process that a client performs in sending an update SQL statement.

In sending an update SQL statement in step 802, the client first determines in step 804 whether the mode is proxy. If the mode is proxy, the client determines whether the update SQL statement is likely to update the data referred to by the select SQL statement in step 706.

To determine whether the update SQL statement is likely to update the referred data, the client checks the select SQL statements in the referred SQL storage unit and the results of the select SQL statements.

For example, if a select SQL statement, SQL D (SELECT), of FIG. 16 is stored in the referred SQL storage unit, the client determines that an update SQL statement, SQL E (UPDATE), is unlikely to update the referred data; it determines that SQL F (UPDATE) is likely to update the referred data.

If the client determines in step 806 that the update SQL statement is likely to update the referred data, it directly sends an SQL statement already referred through the proxy to the database again and then receives the reference result.

If the client does not send a transaction directly in step 808 (if the transaction status is inactive), it requests the database to start a transaction in step 810 and sends select SQL statements in step 812.

After receiving the reference result in step 814, the client changes the mode to direct in step 816 and sends a commit request to the DB proxy in step 818. The process then proceeds to step 820.

If the mode is not proxy or after receiving the reference result, the client sends an update SQL statement to the database and then receives the update result.

If the client does not send a transaction directly in step 820 (if the transaction status is inactive), it requests the database to start a transaction in step 822, changes the transaction status to active in step 824, and sends an update SQL statement in step 826. After receiving the update result in step 828, the client adds the update SQL statement to the updated SQL statement storage unit in step 830.

Figure 9:
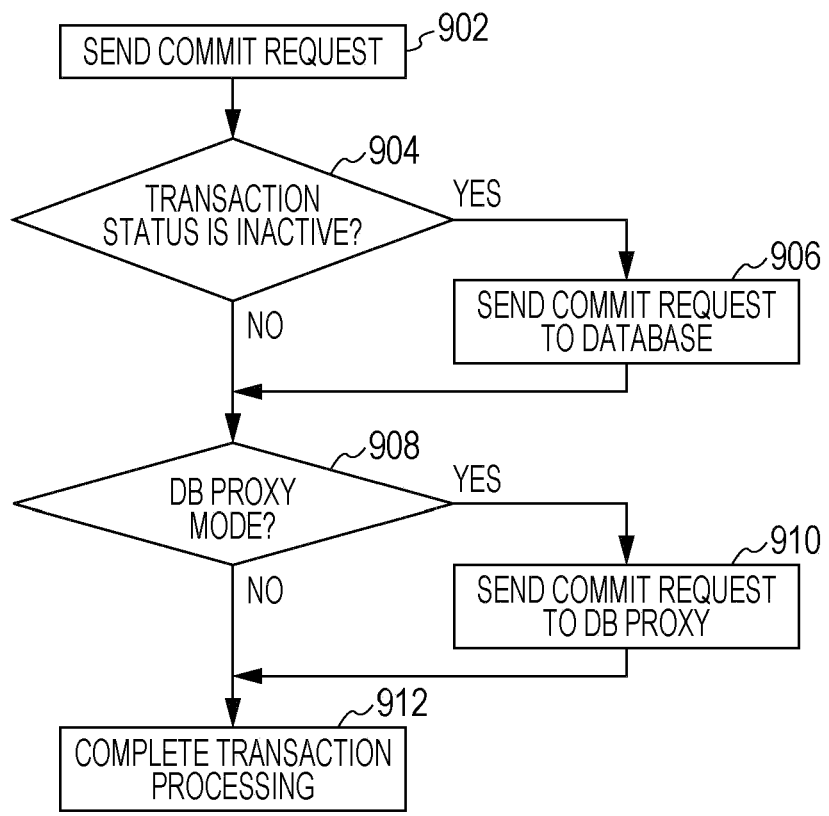
FIG. 9 is a flowchart of a process that a client performs in sending a commit request.

FIG. 9 is a flowchart of a process that a client performs in sending a commit request.

In sending a commit request in step 902, the client determines in step 904 whether the transaction status is inactive. If inactive, the client sends a commit request to the database 130 in step 906 and proceeds to step 908.

If the transaction status is active in step 904, the client determines in step 908 whether the mode is DB proxy. If DB proxy mode, the client sends a commit request to the DB proxy 120 in step 910 and proceeds to step 912. If the mode is not DB proxy in step 908, the client completes the transaction processing in step 912.

Figure 10:
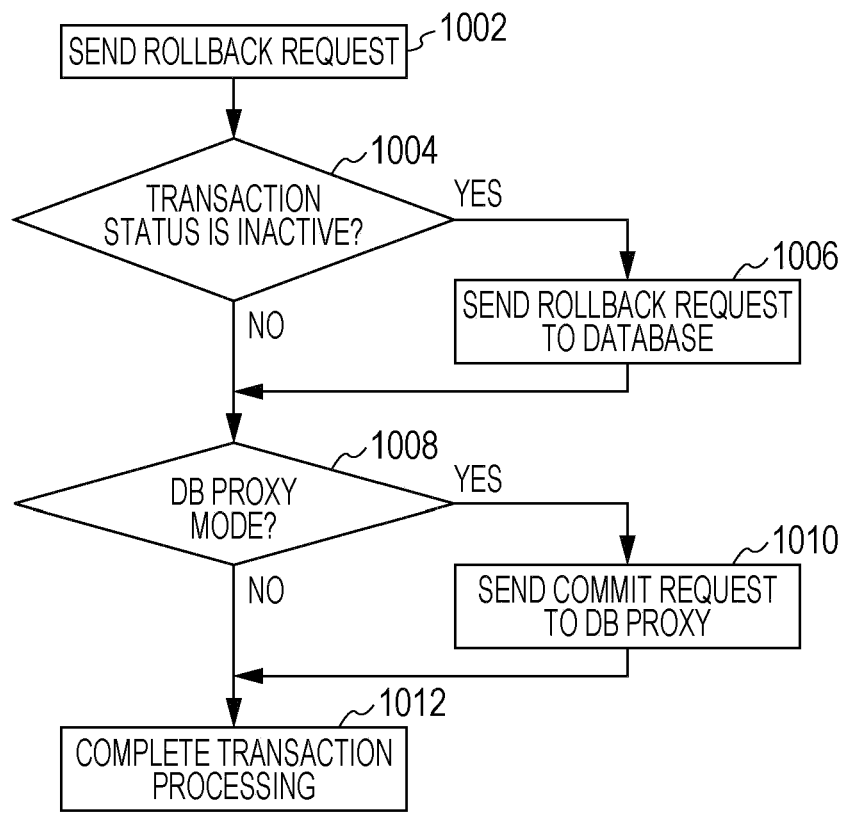
FIG. 10 is a flowchart of a process that a client performs in sending a rollback request.

FIG. 10 is a flowchart of a process that a client performs in sending a rollback request.

In sending a rollback request in step 1002, the client determines in step 1004 whether the transaction status is inactive. If inactive, the client sends a rollback request to the database in step 1006 and proceeds to step 1008. If active, the client determines in step 1008 whether the mode is DB proxy. If DB proxy mode, the client sends a commit request to the DB proxy in step 1010 and proceeds to step 1012. If not DB proxy mode, the client completes the transaction processing in step 1012.

Figure 11:
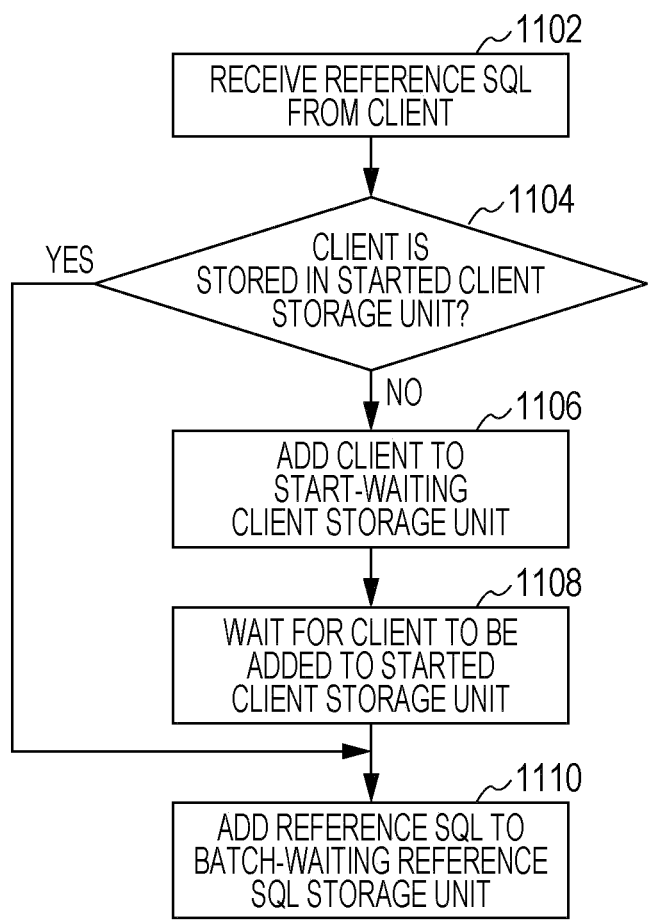
FIG. 11 is a flowchart of a process that a DB proxy performs when receiving a select SQL statement.

FIG. 11 is a flowchart of a process that a DB proxy performs when receiving a select SQL statement.

When receiving a select SQL statement from a client in step 1102, the DB proxy determines in step 1104 whether the client is stored in the started client storage unit. If stored, the process proceeds to step 1110. If not stored, the DB proxy adds the client to the start-waiting client storage unit in step 1106. In step 1108, the DB proxy waits the client to be added to the started client storage unit. The DB proxy then adds a select SQL statement to the batch-waiting reference SQL storage unit in step 1110.

Figure 12:
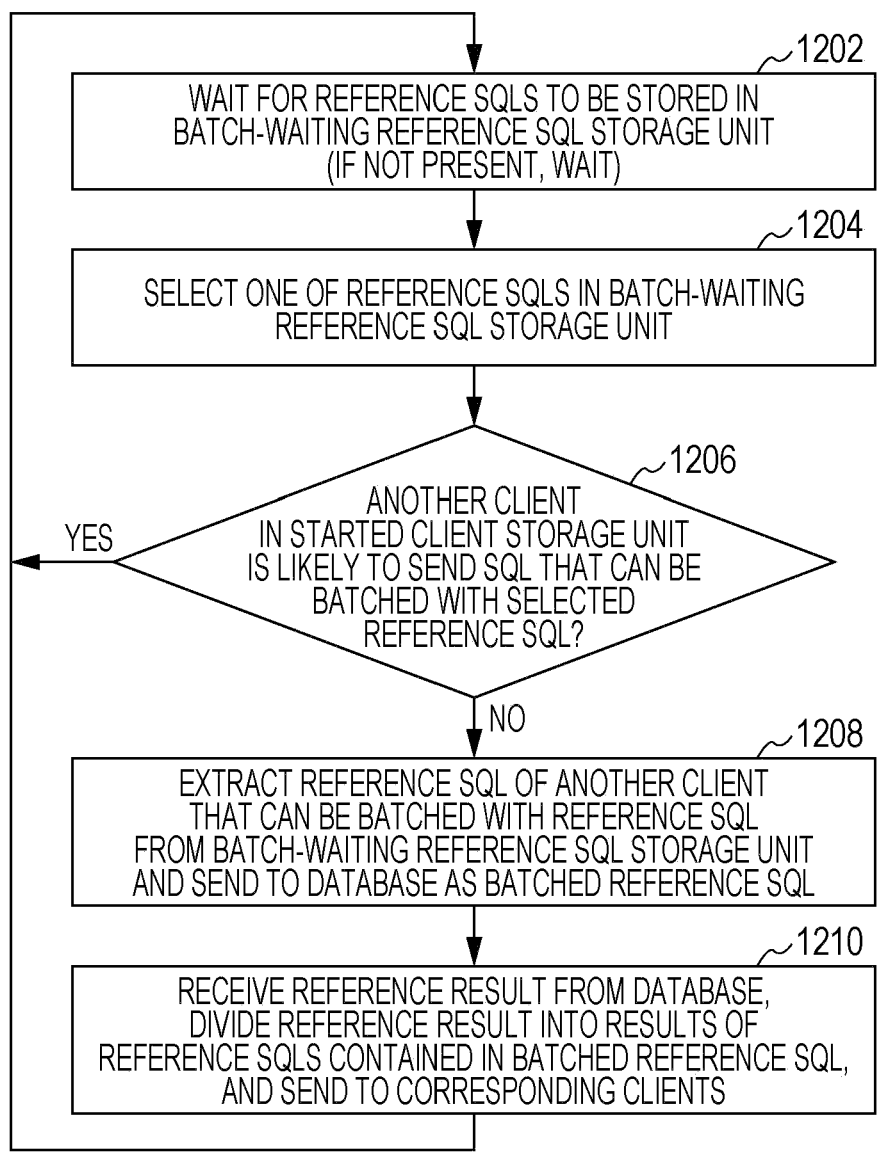
FIG. 12 is a flowchart of a process that a DB proxy performs in sending a batched select SQL statement.

FIG. 12 is a flowchart of a process that a DB proxy performs in sending a batched select SQL statement.

In step 1202, the DB proxy waits for select SQL statements to be stored in the batch-waiting reference SQL storage unit. In step 1204, the DB proxy selects one of the select SQL statements stored in the batch-waiting reference SQL storage unit.

In step 1206, the DB proxy determines whether another client stored in the started client storage unit is likely to send an SQL statement which can be batched with the selected select SQL statement. If likely, the process proceeds to step 1202. If unlikely, in step 1208, the DB proxy extracts from the batch-waiting reference SQL storage unit the select SQL statement of the another client that can be batched with the selected select SQL statement and sends the extracted select SQL statement to the database as a batch select SQL statement. In step 1210, the DB proxy receives the reference result from the database, divides the reference result into results of the select SQL statements contained in the batched select SQL statement, and sends the divided results to the corresponding clients.

Figure 13:
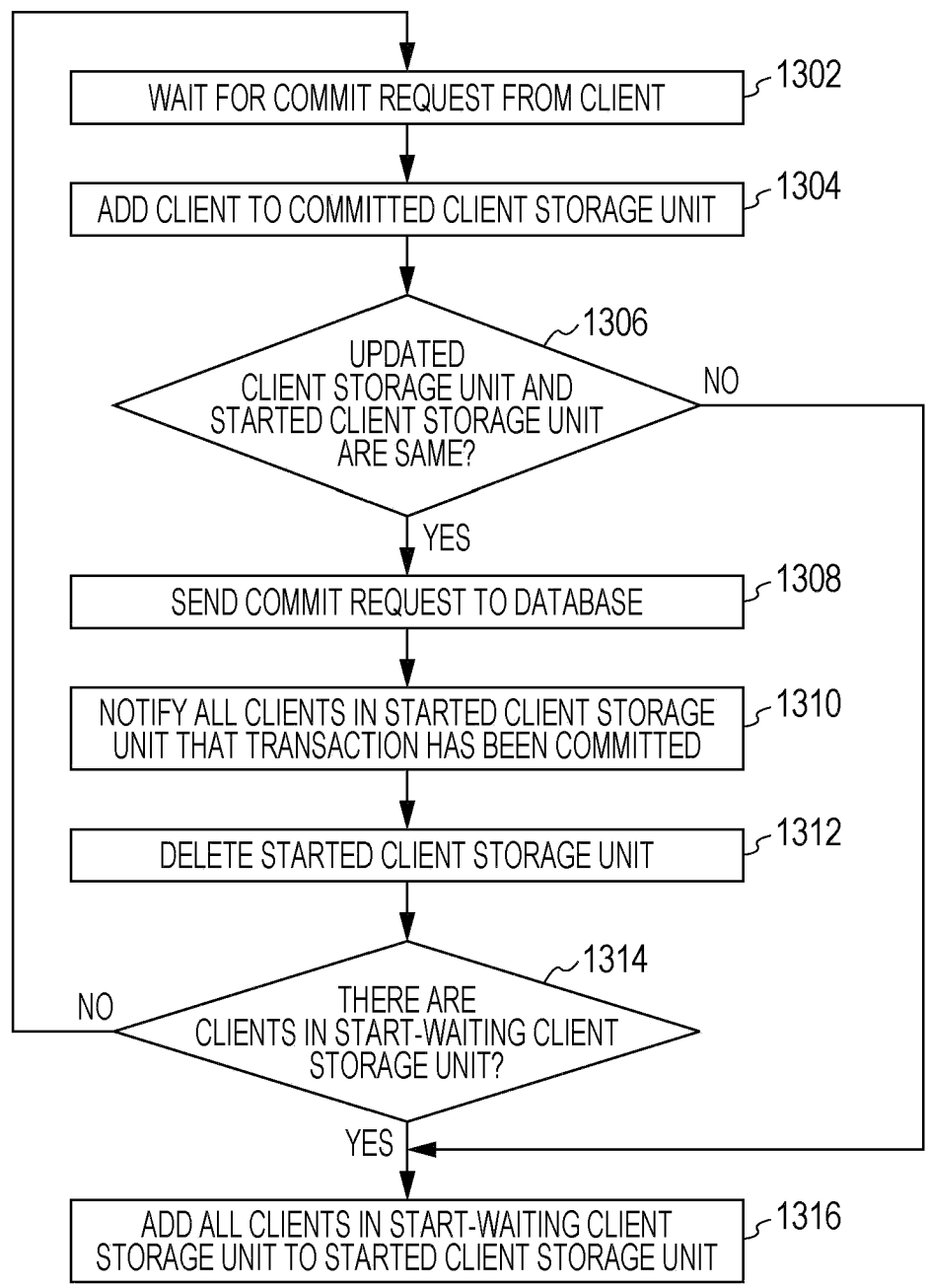
FIG. 13 is a flowchart of a process that a DB proxy performs in sending a transaction commit request.

FIG. 13 is a flowchart of a process that a DB proxy performs in sending a transaction commit request.

In step 1302, the DB proxy waits a commit request from a client. In step 1304, the DB proxy adds the client to the committed client storage unit.

In step 1306, the DB proxy determines whether the clients stored the committed client storage unit and those stored in the started client storage unit are the same. If not the same, the process proceeds to step 1316. If the same, the DB proxy requests the database to commit the transaction in step 1308 and notifies all the clients in the started client storage unit that the transaction has been committed, in step 1310.

In step 1312, the DB proxy deletes the clients stored in the started client storage unit. In step 1314, the DB proxy determines whether any client is present in the start-waiting client storage unit. If not present, the process proceeds to step 1302. If present, the DB proxy adds all the clients stored in the start-waiting client storage unit to the started client storage unit.

An example system configuration according to the embodiment of the present invention will be described with reference to the drawing. Note that the components described herein are not essential configuration elements but are intended to describe one embodiment and that the technical scope of the present invention should not be construed as being limited to this embodiment.

Figure 14:
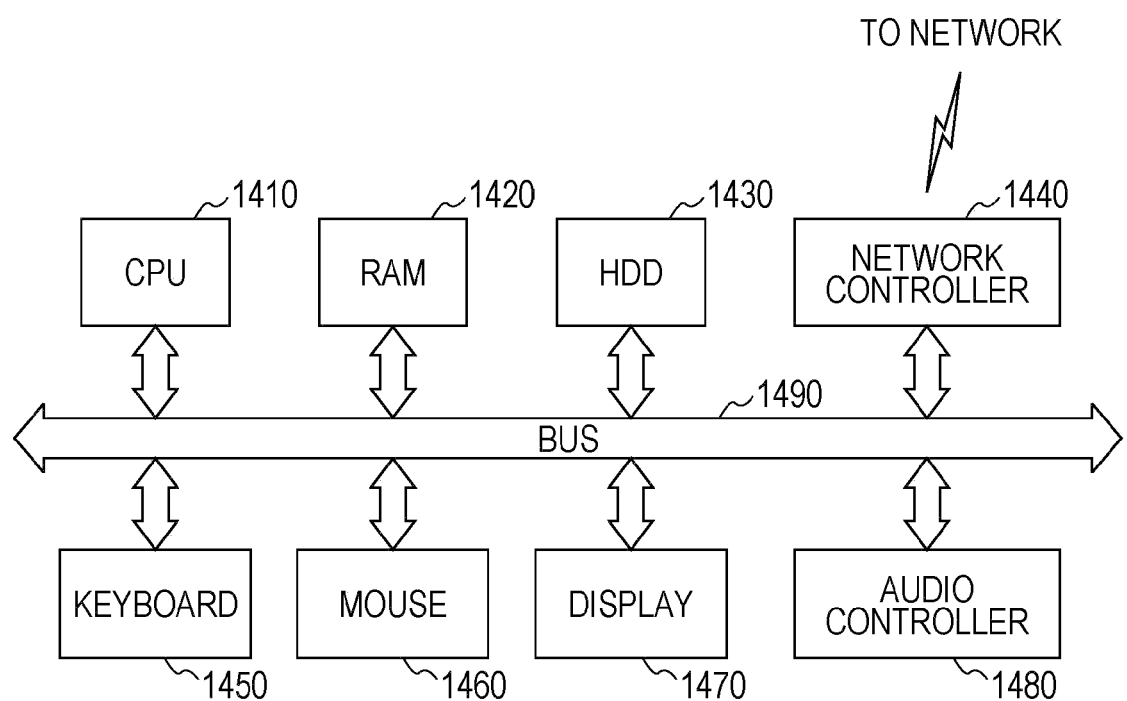
FIG. 14 shows an illustrative hardware configuration of a client, a DB proxy, or a database.

FIG. 14 is a block diagram of computer hardware for realizing the system configuration of the client, DB proxy, or database according to this embodiment.

In FIG. 14, a CPU 1410, a main memory (RAM) 1420, a hard disk drive (HDD) 1430, a network controller 1440, a keyboard 1450, a mouse 1460, a display 1470, and an audio controller 1480 are connected to a system bus 1409.

The CPU 1410 is preferably based on a 32-bit or 64-bit architecture and can be, for example, Pentium™ 4 available from Intel Corporation, Core™ 2 DUO available from Intel Corporation, or Athlon™ available from Advanced Micro Devices, Inc. The capacity of the main memory 1420 is preferably not less than 1 GB, and more preferably not less than 2 GB.

An operating system is installed on the hard disk drive 1430. The operating system can be of any type conforming to the CPU 1410, such as Linux™; Windows™ 7, Windows XP™, or Windows™ 2000 available from Microsoft Corporation; or Mac OS™ available from Apple Inc.

A relational database application, preferably, ORACLE™, DB2™, SQL STATEMENTSERVER™, or ACCESS™ is installed on the hard disk drive 1430. The relational database application is not limited to these applications or software and can be of any type as long as it can interpret SQL statements. According to a keyboard or mouse operation by the operator, these programs are loaded into the main memory 1420 to run.

The keyboard 1450 and the mouse 1460 are used to start a database application, input a select query, or specify a parameter in accordance with a graphic user interface provided by the operating system.

The display 1470 is used to display a select query, the reference result, or the like as appropriate. Alternatively, voice can be inputted through the audio controller 1480 using audio recognition software so as to input a select query.

The network controller 1440 communicates with the clients, the DB proxies, and the database through a network. In the present invention, the clients or DB proxies do not need to be present in different pieces of hardware. For example, the DB proxies and the database can be formed in a single piece of computer hardware. Alternatively, the clients, the DB proxies, and the database can be provided on a single database server.

What is claimed is:

1. A method for accessing a database and combining a plurality of transactions by a computer, the method comprising:
receiving a plurality of transactions from a plurality of clients, wherein each of said plurality of transactions comprises a select query;
combining said select queries in said transactions using a set operator, wherein said select query comprises a plurality of SQL statements;
associating each of said SQL statements from said select queries to be combined with a client ID of said corresponding client;
generating a first list of data types for each selected SQL statement, wherein said first list of data types comprises data types from said selected SQL statement and said corresponding client ID;
generating a second list of data types, wherein said second list of data types comprises all said data types from said selected SQL statements;
converting said SQL statements of each said client so that said data types of each said SQL statement are arranged in order of said data types of a corresponding data type set;
storing a correspondence between said data types of a converted SQL statement and said data types of an unconverted SQL statement for each of said client IDs of said clients;
combining all said converted SQL statements using said set operator;
sending combined SQL statements to said database; and
sending combined select queries to said database as a combined transaction.

2. The method according to claim 1, further comprising:
receiving a result of said combined transaction from said database.

3. The method according to claim 2, further comprising:
dividing said result into reference results of said transactions; and
sending said reference results.

4. The method according to claim 3, wherein dividing said result into reference results further comprises:
determining said client IDs from said result received from said database;
converting said result of each determined client IDs into a second reference result of said unconverted SQL statement from stored said correspondence; and
sending each of said second reference result to said client having said corresponding client ID.

5. The method according to claim 1, further comprising:
updating data referred through said combined transaction by using said client in said combined transaction.

6. The method according to claim 5, wherein updating data referred through said combined transaction further comprises:
inquiring whether said data to be updated has been referred to said combined transaction;
directly requesting said database to process said select query processed in said combined transaction, provided that said data to be updated has been referred in said combined transaction; and
directly requesting said database to process an update query for updating said data in accordance with a commit request from said client.

7. A system for accessing a database and combining a plurality of transactions, the system comprising:
a processor implemented database proxy configured to:
receive a plurality of transactions from a plurality of clients, wherein said plurality of transactions each comprises a select query;
combine said select queries in said transactions using a set operator, wherein said select query comprises a plurality of SQL statements;
associate each of said SQL statements from said select queries to be combined with a client ID of said corresponding client;
generate a first list of data types for each selected SQL statement, wherein said first list of data types comprises data types from said selected SQL statement and said corresponding client ID;
generate a second list of data types, wherein said second list of data types comprises all said data types from said selected SQL statements;
convert said SQL statements of each said client so that said data types of each said SQL statement are arranged in order of said data types of a corresponding data type set;
store a correspondence between said data types of a converted SQL statement and said data types of an unconverted SQL statement for each of said client IDs of said clients;
combine all said converted SQL statements using said set operator;
send combined SQL statements to said database; and
send combined select queries to said database as a combined transaction.

8. The system according to claim 7, wherein the database proxy is configured to receive a result of said combined transaction from said database.

9. The system according to claim 8, wherein the database proxy is configured to divide said result into reference results of said transactions; and
send said reference results.

10. The system according to claim 9, wherein the database proxy is configured to determine said client IDs from said result received from said database;
convert said result of each determined client IDs into a second reference result of said unconverted SQL statement from stored said correspondence; and
send each of said second reference result to said client having said corresponding client ID.

11. The system according to claim 7, the database proxy is configured to update data referred through said combined transaction by using said client in said combined transaction.

12. The system according to claim 11, wherein the database proxy is configured to inquire whether said data to be updated has been referred to said combined transaction;
directly request said database to process said select query processed in said combined transaction, provided that said data to be updated has been referred in said combined transaction; and
directly request said database to process an update query for updating said data in accordance with a commit request from said client.

13. A non-transitory computer readable storage medium tangibly embodying a computer readable program code having computer readable instructions which when implemented, cause a computer to implement a method for accessing a database and combining a plurality of transactions by the computer, the method comprising:

receiving a plurality of transactions from a plurality of clients, wherein each of said plurality of transactions comprises a select query;

combining said select queries in said transactions using a set operator, wherein said select query comprises a plurality of SQL statements;

associating each of said SQL statements from said select queries to be combined with a client ID of said corresponding client;

generating a first list of data types for each selected SQL statement, wherein said first list of data types comprises data types from said selected SQL statement and said corresponding client ID;

generating a second list of data types, wherein said second list of data types comprises all said data types from said selected SQL statements;

converting said SQL statements of each said client so that said data types of each said SQL statement are arranged in order of said data types of a corresponding data type set;

storing a correspondence between said data types of a converted SQL statement and said data types of an unconverted SQL statement for each of said client IDs of said clients;

combining all said converted SQL statements using said set operator;

sending combined SQL statements to said database; and sending combined select queries to said database as a combined transaction.

* * * * *